Patented Apr. 10, 1951

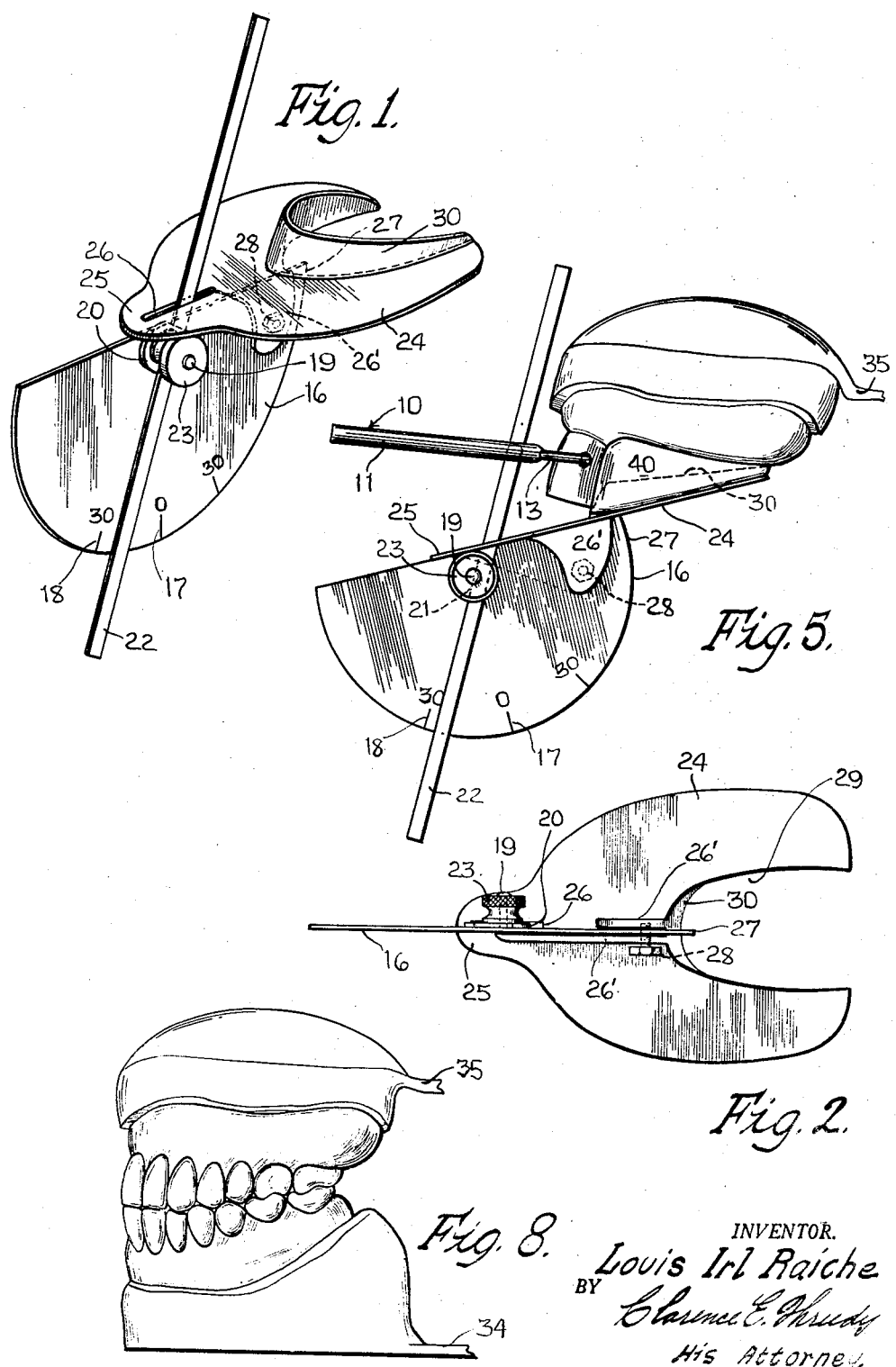

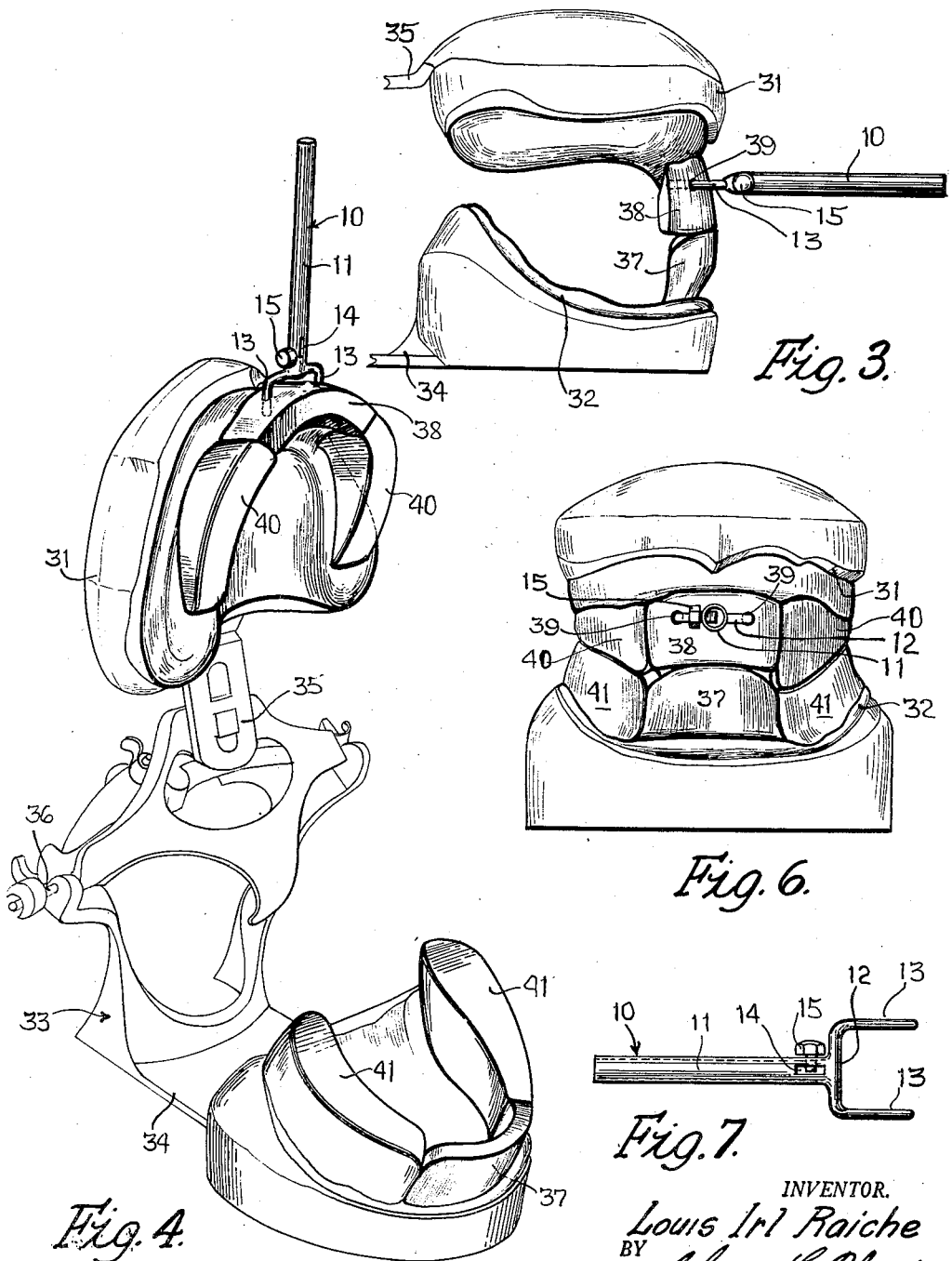

2,548,817

UNITED STATES PATENT OFFICE 2,548,817

DENTAL APPLIANCE FOR DETERMINING PROPER CENTRIC BITE IN THE ART OF PRODUCING ARTIFICIAL DENTURES

Louis Irl Raiche, Chicago, Ill., assignor of twenty-five per cent to Alexander B. Pickands, Chicago, Ill.

Application March 8, 1950, Serial No. 148,404

6 Claims. (Cl. 32—19)

This invention relates to a dental appliance for determining proper centric bite in the art of producing artificial dentures.

An object of the invention is to provide a device of this character which will simplify the determination of the centric bite, eliminating the usual practice of the dental technician of determining the centric bite by a trial and error system. It is recognized in the art of dentistry and by the dental laboratory technician that the correct centric bite is an important factor in the successful construction of artificial dentures. Without an accurate centric bite registration established in the formation of the artificial dentures, there would result a malpositioning of the jaws of the patient and a consequent handicap to appearance as well as to mastication.

It is generally accepted among dental technicians that the angular inclination of the centric bite is approximately 30° plus or minus, and the object of this invention is to readily locate, without the trial and error system, such inclination.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the dental appliance embodying my invention;

Fig. 2 is a top plan view of the same;

Fig. 3 is a typical side elevational view of the upper and lower denture models showing a horizontal bar embodied in my dental appliance mounted in position and with the posterior bite rims removed;

Fig. 4 is a perspective view of a standard articulator with the denture models associated therewith and disclosed in open position and with the bite rims applied to the denture models;

Fig. 5 is a typical side elevational view illustrating the manner of use of the dental appliance embodying my invention;

Fig. 6 is a face view showing the denture models in closed position and with the posterior bite rims built thereon;

Fig. 7 is a plan view of the horizontal bar embodied in the invention;

Fig. 8 is a perspective view of the completed trial denture plates.

I shall first explain the construction of the dental appliance embodying my invention and by means of which the correct centric bite may be determined. In this connection I provide a horizontal bar 10 having a shank 11 substantially cylindrical in cross section. One end of this shank 11 terminates into a fork 12 providing parallel fingers 13. In the shank 10 adjacent the fork 11 is an elongated slot 14. Threaded on the shank 10 to transverse the slot 14 is a binder screw 15.

A gauge plate is indicated at 16. This gauge plate has a score line 17 formed therein and indicating zero position. At a distance of 30° on each side of this score line 17 are score lines 18 each designated 30°. While for the efficient use of the appliance it is only necessary to locate the 30° angle from zero position, additional graduations of lesser or greater distance than 30° may be formed in the gauge plate 16.

This gauge plate 16 carries a threaded stud 19 fixed to the gauge plate so as not to rotate relative thereto. Mounted on this stud is a washer 20 having a transversely extending cut-off portion 21 providing a guide for an elongated gauge bar 22. Threaded upon the stud 19 is a knurled nut 23 which, when tightened against the washer 20, will lock the bar 22 in an adjusted position upon the gauge plate 16.

A bite plate 24 is provided. This bite plate is substantially flat in plan view and at one end portion provides a neck 25. This neck 25 has formed therein an elongated slot 26 through which the bar 22 projects. Extending downwardly from the bottom surface of the plate 24 are spaced wings 26 between which the edge portion 27 of the gauge plate 16 is positioned, the gauge plate 16 being pivoted to such wings by a pintle 28.

The upper surface of the bite plate 24 adjacent its outer end has a cut-out portion indicated at 29, and extending around this cut-out portion is a flanged yoke 30 which serves as a locating means for locating the plate within the area of the upper denture model to the rear of the anterior bite rims of the upper trial denture plate.

In the use of my improved dental appliance, the upper and lower casts 31 and 32 are mounted in a manner well known in the art in vertical relation with respect to each other upon the arms of a suitable articulator 33 comprising a base structure 34 and an upper structure 35 adjustably pivoted together as at 36. This articulator 33 forms no part of the present invention and any suitable articulator may be used for the purpose.

From these casts, the trial base plates are formed in the usual manner. These trial base plates are mounted upon the casts 31 and 32 with the posterior bite rims removed, leaving only the anterior portions 37 and 38 of the bite rims. There are formed in the anterior bite rim portion 38 spaced openings 39 into which are projected the fingers 13 of the horizontal bar 10, thereby to provide a connection between the bar 10 and the upper cast 31.

The bar 22 is adjusted with respect to the gauge plate 16 by registering an edge thereof with the 30° score line as shown in Fig. 1. After this adjustment has been made, the bar 22 is latched in this adjusted position by the nut 23 brought to bear upon the washer 20. The upper end portion of the bar 22 is projected through the slot 26 of the bite plate 24 and also through the slot 14 of the horizontal bar 10. The assembled unit is now positioned with respect to the upper cast 31 with the rim 30 engaging to the rear of the anterior bite rim portion 38 of the upper trial base plate and with the bite plate disposed at an angle of 30° with respect to the long axis of the horizontal bar 10, thus positioning the bite plate at an accepted angle with respect to the trial base plate on the upper cast 31 and on which bite plate the posterior bite rims may now be built in conformity with the inclination of such bite plate with respect to the horizontal bar 10, with the result such as is shown in Figs. 4 and 6.

After building up the posterior bite rims 40 the trial base plate mounted on the upper cast 31 to an inclination corresponding to that of the bite plate 24 with respect to the horizontal bar 10, the plate 24 and its associated parts, including the horizontal bar 10, are removed to permit the technician to build up the posterior bite rims 41 of the lower trial base plate in conformity to the inclination of the bite rims 40 of the upper trial base plate. These posterior bite rims are usually formed of a pliable plastic material and from them are formed the completed wax trial base plates. These trial base plates are now placed in the mouth of the patient for trial, and the confronting surfaces of the trial base plates act as a cam to cam the mandible into correct centric bite position. From these trial base plates the dental technician, in a manner well known in the art, produces the final dentures which are usually formed of acrylic denture material.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A dental appliance for determining the inclination of the centric bite comprising a gauge plate on one surface of which are one or more graduations, a cooperating gauge bar extending transversely of the gauge plate and having connection thereto for circumferential adjustment with respect thereto to line an edge of the bar in registration with one of said graduations, means for pivotally connecting said bar to said gauge plate, a member having at one end portion a fork providing parallel fingers adapted to be inserted into openings formed in the anterior bite rim of an upper trial base plate and having a slot formed therein through which said bar is slidably projected, and a bite plate pivotally connected to said gauge plate in a plane substantially at right angles with respect to said gauge plate and having a portion providing an elongated slot through which said gauge bar projects.

2. A dental appliance for determining the inclination of the centric bite comprising a gauge plate on one surface of which are one or more graduations, a cooperating gauge bar extending transversely of the gauge plate and having connection thereto for circumferential adjustment with respect thereto to line an edge of the bar in registration with one of said graduations, means for pivotally connecting said bar to said gauge plate, a member having means for attachment to the anterior bite rim of an upper trial base plate in a lateral horizontal direction with respect thereto and having a slot formed therein through which said bar is slidably projected, and a bite plate pivotally connected to said gauge plate in a plane substantially at right angles with respect to said gauge plate and having a portion providing an elongated slot through which said gauge bar projects.

3. A dental appliance for determining the inclination of the centric bite comprising a member having means for attachment to the anterior bite rim of an upper trial base plate in a horizontal lateral position with respect thereto, a bite plate of flat elongated formation and adapted as a support for the formation thereon of the posterior bite rims of said trial base plate, and gauge means for locating said bite plate at a predetermined angle of inclination with respect to said member.

4. A dental appliance for determining the inclination of the centric bite comprising a member having means for attachment to the anterior bite rim of an upper trial base plate in a horizontal lateral position with respect thereto, a bite plate of flat elongated formation and adapted as a support for the formation thereon of the posterior bite rims of said trial base plate, and gauge means for locating said bite plate at a predetermined angle of inclination with respect to said member, said attaching means for said member comprising a fork providing parallel fingers insertable in openings formed in said anterior bite rim.

5. A dental appliance for determining the inclination of the centric bite comprising a member having means for attachment to the anterior bite rim of an upper trial base plate in a horizontal lateral position with respect thereto, a bite plate of flat elongated formation and adapted as a support for the formation thereon of the posterior bite rims of said trial base plate, gauge means for locating said bite plate at a predetermined angle of inclination with respect to said member, means providing pivotal connection between said gauge means and said bite plate, and means providing connection between said member and said gauge means.

6. A dental appliance for determining the inclination of the centric bite comprising a member having means for attachment to the anterior bite rim of an upper trial base plate in a horizontal lateral position with respect thereto, a bite plate of flat elongated formation and adapted as a support for the formation thereon of the posterior bite rims of said trial base plate, gauge means for locating said bite plate at a predetermined angle of inclination with respect to said member, said attaching means for said member comprising a fork providing parallel fingers insertable in openings formed in said anterior bite rim, means providing pivotal connection between said gauge means and said bite plate, and means providing connection between said member and said gauge means.

LOUIS IRL RAICHE.

REFERENCES CITED

The following references are of record in the file of this patent:

UNITED STATES PATENTS

| Number | Name | Date |
| --- | --- | --- |
| 1,546,423 | Williams | July 21, 1925 |
| 1,830,248 | Smith | Nov. 3, 1931 |
| 1,856,779 | Montelius | May 3, 1932 |